(12) United States Patent
Woloszyn et al.

(10) Patent No.: US 12,461,733 B2
(45) Date of Patent: *Nov. 4, 2025

(54) METHOD AND SYSTEM FOR COMPUTER UPDATE REQUIREMENT ASSIGNMENT USING A MACHINE LEARNING TECHNIQUE

(71) Applicant: Capital One Services, LLC, McLean, VA (US)

(72) Inventors: John Woloszyn, Dallas, TX (US); Praveen Kumar Gadipelly, Frisco, TX (US); Michael O'Malley, Prosper, TX (US); Afsar Khan, Little Elm, TX (US); Naga Satya Subbarao Pisupat Venkata Krishna, McKinney, TX (US); Travis Landrith, Frisco, TX (US); John Corretti, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 196 days.

This patent is subject to a terminal disclaimer.

(21) Appl. No.: 17/941,242

(22) Filed: Sep. 9, 2022

(65) Prior Publication Data

US 2023/0077253 A1    Mar. 9, 2023

Related U.S. Application Data

(63) Continuation of application No. 17/089,045, filed on Nov. 4, 2020, now Pat. No. 11,467,820.

(51) Int. Cl.
*G06F 9/44* (2018.01)
*G06F 8/65* (2018.01)
(Continued)

(52) U.S. Cl.
CPC ............... *G06F 8/65* (2013.01); *G06F 18/24* (2023.01); *G06N 5/01* (2023.01)

(58) Field of Classification Search
None
See application file for complete search history.

(56) References Cited

U.S. PATENT DOCUMENTS 8,645,736 B1 *  2/2014  Tabone ................ G06F 9/4418
                                                   713/323
9,158,525 B1 * 10/2015  Naganathan ........... G06F 9/542
(Continued)

FOREIGN PATENT DOCUMENTS

CN          112052022 A        12/2020

OTHER PUBLICATIONS

Notification Concerning Transmittal of International Preliminary Report on Patentability from related PCT Application No. PCT/US2021/058067, mailed May 19, 2023, 10 pages.
(Continued)

*Primary Examiner* — Insun Kang
(74) *Attorney, Agent, or Firm* — HUNTON ANDREWS KURTH LLP

(57) ABSTRACT

A novel data collection technique is disclosed. This data collection technique gathers data relating to various technical processes implemented in a computer network. A database including past assignment of requirements is also provided. These requirements can be software update requirements relating to a computer network. A classification model is trained using the assignment records fort these requirements and the data collected relating to the technical processes. Using the classification model, new requirements can be classified and implemented on the computer network.

19 Claims, 6 Drawing Sheets

(51) Int. Cl.
  *G06F 18/24*   (2023.01)
  *G06N 5/01*    (2023.01)

(56) References Cited

U.S. PATENT DOCUMENTS

| | | | | |
|---|---|---|---|---|
| 10,209,974 | B1* | 2/2019 | Patton | G06F 8/60 |
| 10,489,138 | B1* | 11/2019 | Wu | H04L 41/0853 |
| 11,544,050 | B1* | 1/2023 | Ankit | G06F 11/3668 |
| 2007/0060394 | A1* | 3/2007 | Gowin | G07F 17/323 463/47 |
| 2007/0240152 | A1* | 10/2007 | Li | G06F 8/65 717/124 |
| 2015/0248284 | A1* | 9/2015 | Poiesz | G06F 8/65 717/168 |
| 2015/0347908 | A1 | 12/2015 | Matthew et al. | |
| 2017/0357502 | A1 | 12/2017 | Barday | |
| 2018/0276355 | A1 | 9/2018 | Barday et al. | |
| 2019/0050205 | A1 | 2/2019 | Barday | |
| 2019/0250898 | A1 | 8/2019 | Yang | |
| 2020/0125992 | A1* | 4/2020 | Agarwal | G06N 3/084 |
| 2020/0242464 | A1 | 7/2020 | Hirai et al. | |
| 2020/0394465 | A1* | 12/2020 | Gil Ramos | G06F 18/2155 |
| 2021/0048996 | A1* | 2/2021 | Marzorati | G06N 20/00 |
| 2021/0160368 | A1 | 5/2021 | Liang et al. | |
| 2021/0240777 | A1* | 8/2021 | Zweig | G06N 20/00 |
| 2021/0405991 | A1* | 12/2021 | Parra | G06F 9/4406 |
| 2022/0004886 | A1* | 1/2022 | Exner | G06N 5/022 |
| 2022/0109983 | A1 | 4/2022 | Barkam et al. | |

OTHER PUBLICATIONS

Hallseth, K., "Process Modelling & Mapping: The Basics," David Thumpson Health Region, downloaded from https://cdn.ymaws.com/www.bfma.org/resource/resmgr/articles/08_64.pdf.

Ramasarma, M., "Process Approach to Requirements Gathering," (2015) BATimes.com, downloaded from https://www.batimes.com/articles/process-approach-to-requirements-gathering.html.

Nelson, K., "The Automation of Compliance," (2016) DevOps.com, downloaded from https://devops.com/devops-automation-compliance/.

Owen, R., "Compliance Automation and its Benefits for Reporting," Reciprocity, downloaded from https://reciprocitylabs.com/automation-and-its-benefits-for-compliance-reporting/.

Logpoint as a tool for compliance automation, downloaded from https://www.logpoint.com/en/understand/how-to-comply-with-logpoint/.

International Search Report and the Written Opinion of the International Searching Authority issued in related PCT Application No. PCT/US2021/058067, mailed Feb. 9, 2022.

* cited by examiner

METHOD AND SYSTEM FOR COMPUTER UPDATE REQUIREMENT ASSIGNMENT USING A MACHINE LEARNING TECHNIQUE

CROSS-REFERENCE TO RELATED APPLICATIONS

The subject application is a continuation of U.S. patent application Ser. No. 17/089,045 filed Nov. 4, 2020, now U.S. Pat. No. 11,467,820, the contents of which are hereby incorporated by reference in their entireties.

BACKGROUND

Computer systems of many organizations are sophisticated and expansive. These computer systems require special attention and the organizations generally hire administrators to manage and maintain these systems. Given the complexity of these systems, many organizations even outsource the responsibility for management and maintenance of their computer systems. However, outsourcing these responsibilities can be costly and can create other issues.

SUMMARY

Each day, any company that utilizes a sophisticated computer network can receive one or more requirements relating to the company's computer systems or networks. In particular, these requirements can relate to the technical features of the computer systems or networks, e.g., they can require updating or modifying a system or subsystem. Implementing these requirements and ensuring compliance with them can be a daunting task. For example, a midsize company can utilize hundreds of computer processes simultaneously. When a security or software update is issued to the organization, an individual needs to evaluate each and every one of the processes. For each update, there can be many processes that should apply the update. This requires a manual study of each process by a member of the organization to assign the update to the appropriate process or processes. Because each update can be applicable to many processes, and an organization can receive many updates in a short period of time, there can be numerous unique many-to-many relationships between the updates and the process(es) which should receive these updates. This is a daunting task which requires significant resource allocation by information technology department of each company. Oftentimes the companies cannot keep up with the pace at which these requirements arrive, and as a result, by the time a requirement is implemented, the requirement is already outdated by another requirement. Therefore, it is an object of this disclosure to provide for a method and system which can accelerate the allocation of these technical requirements and decrease the resources needed for their allocation.

A novel data collection technique is disclosed. This data collection technique gathers data relating to various technical processes implemented in a computer network. A database including past assignment of requirements is also provided. These requirements can be software update requirements relating to a computer network. A classification model is trained using the assignment records fort these requirements and the data collected relating to the technical processes. Using the classification model, new requirements can be classified and implemented on the computer network.

In one example embodiment, a method for assigning computer updates using a classification model is described. The method can include a step for receiving at a server a first signal from a smart device indicating a location of the device. The method can also include a step for receiving at the server a second signal from an email server indicating a frequency of receiving emails at the server. The server can further receive a third signal from a phone server indicating whether a phone line is active. Based on the first signal, the second signal, and the third signal, the server can determine whether to transmit a fourth signal to the smart device of the user, wherein the fourth signal is configured to cause a user interface of the smart device to display a prompt and collect a set of data from the user. Subsequently, the server will receive the collected data from a plurality of smart devices a plurality of users. The method can further include a step for storing the collected data in a database of the server and training a classification model using the collected data and an assignment record for requirements. In one example, the server can receive at the server a requirement for updating a computer. Using a classification model, the server can assign the requirement to at least one computer process and the server can transmit a patch to the computer to update the at least one computer process.

In one example embodiment, the server can also receive a signal from a tracking device indicating a heart rate of the user. If the heart rate indicates that the user is walking or running, the server will not prompt the user. On the other hand, if the signal indicates that the user is sitting at the user's work station, as ascertained by GPS location and heart rate, the server can transmit a prompt to the user.

In one example, the server transmits the prompt to the smart device only if the smart device is within a predefined location. In one example, the server transmits the prompt to the smart device only if the email frequency is below a threshold value. In one example, the server transmits the prompt to the smart device only if the phone line is inactive.

In one example, the prompt is a questionnaire inquiring about a process and at least one sub-process assigned to the user. In one example, the questionnaire includes a plurality of binary questions or the questionnaire is a decision tree.

In one example, the database includes a plurality of requirements and the assignment record for requirements describes assignment of each requirement in the database to processes and sub-processes.

In one example, training the classification model includes a supervised learning technique and implementation of a Decision Tree Algorithm. In one example, the Decision Tree Algorithm is one of a Classification and Regression Tree (CART), Decision Stump, and Conditional Decision Trees.

In one example, the server further receives a dispute request from an administrator regarding the assignment of the requirement to the at least one computer process. The server can reclassify the requirement in response to the dispute request.

In one example, the requirement can be a legal requirement imposed by state or federal law, wherein the requirement obligates the company to change an operational process. For example, the requirement can relate to an operational aspect of a business.

In one example, a smart device can receive computer updates using a classification model. The smart device can transmit to a server a first signal indicating a location of the device. The signal may also include fitness data, e.g., heartbeat rate, as well as data received from a social media account, e.g., a number of social media notifications and/or messages or likes received over a period of time.

The smart device can receive a fourth signal configured to cause a user interface of the smart device to display a prompt and collect a set of data from a user. The smart device can also receive input from the user including a set of data. Subsequently, the smart device can transmit to the server the collected data. In response, the smart device can receive a patch to update the at least one computer process.

The server is configured to receive a second signal from an email server indicating a frequency of receiving emails at the server and a third signal from a phone server indicating whether a phone line is active. Based on the first signal, the second signal, and the third signal, the server can determine whether to transmit the fourth signal to the smart device. The server is further configured to receive the collected data from a plurality of smart devices and store the collected data in a database of the server. Using the collected data and an assignment record for the requirements, the server can train the classification model. In one example, the server can receive a requirement for updating a computer. Using the classification model, the server can assign the requirement to at least one computer process.

In one example, the server transmits the prompt to the smart device only if the smart device is within a predefined location. In one example, the server transmits the prompt to the smart device only if the email frequency is below a threshold value. In one example, the server transmits the prompt to the smart device only if the phone line is inactive.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
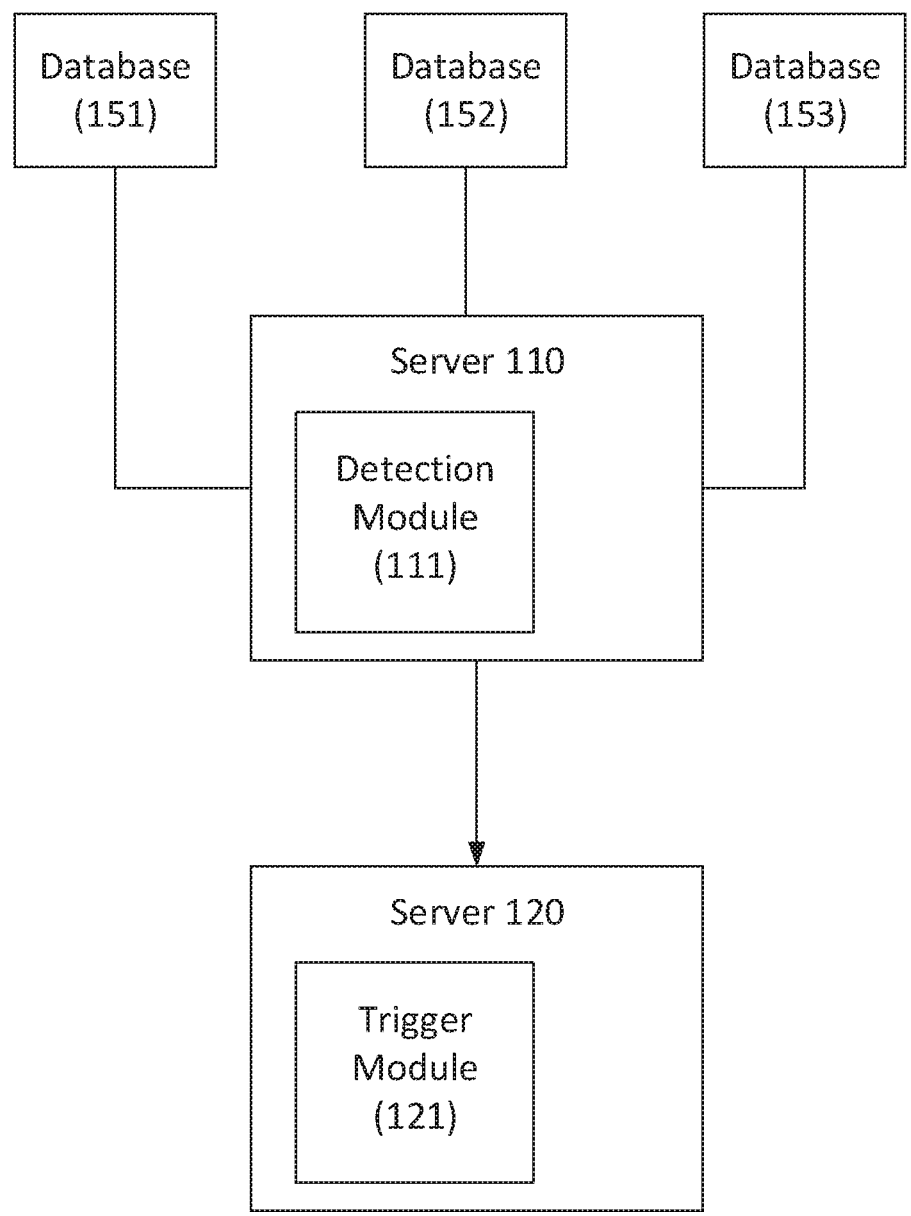
FIG. 1 shows an example system including a detection module and a trigger module.

Exemplary embodiments of the invention will now be described in order to illustrate various features of the invention. The embodiments described herein are not intended to be limiting as to the scope of the invention, but rather are intended to provide examples of the components, use, and operation of the invention.

In an example embodiment, a company can engage in a plurality of processes. These processes can be technical processes (e.g., relating to the company's computer systems or networks), operational processes or other processes. The company can receive a requirement pertaining to a process. The requirement can be applicable to some, all or none of the processes of the company. The company can be obligated to implement the requirement, or it can be recommended for the company to implement the requirement.

In one example embodiment, a requirement can be a technical requirement. Technical requirements can relate to the company's computer systems or networks. For example, technical requirements can relate to the software or hardware implementations of a computer system. A software requirement can involve installing, updating, modifying, deleting or uninstalling a software program, module or operating system relating to a computer system or computer network. For example, a system administrator can receive a message requiring an update to a network security software program via patch. A hardware requirement can involve installing, updating or removing a hardware component relating to the computer system or network. For example, a system administrator can receive a recall message relating to a hardware component, e.g., a particular processor. While technical requirements are described in connection with software and hardware features of computer systems or networks, one of ordinary skill in the art recognizes that technical requirements are not limited to this description.

In one example embodiment, a requirement can be imposed by a law or regulation. For example, a company's business or practice can be regulated by a law or regulation, e.g., regulation Z for automobile finance companies. Each time, a governing body can send a requirement to the company requiring the company to comply with the requirement. These requirements can be mandated on Federal or state level. For example, the requirement can be characterized as "the company must do X." In the context of automobile finance, for example, a requirement can deal with the company's practices relating to lending. For example, these requirements can deal with the company's communications, e.g., how many letters have to be sent out for a financing case and when the letters need to go out; what information can be communicated to customers over the phone; etc. Other examples can include the company's practices relating to lending, e.g., which applicants are provided with financing and which applicants are rejected; what variables are used in making credit decisions; etc.

In one example embodiment, a requirement can be an operational requirement. Operational requirements can relate to the operational processes of a business. For example, operational processes for a business can be related to how information is collected from customers, how customers are contacted, etc. Operational processes can also include technical systems, which can receive technical requirements. For example, a company can receive a technical requirement relating to an application which collects information from new customers and stores that data.

In an example embodiment, a data collection technique can be implemented to gather data relating to some or all aspects of the company processes.

For example, a questionnaire can be prepared including various questions pertaining to the company processes. The questionnaire can be sent to an administrator for each process. The questionnaire can inquire about the details of each process, e.g., steps taken in each process. The administrator for each process can answer the questions. Using the administrator's answers to the questions, a database can be maintained including details for each process as well as the steps included in each respective process.

A questionnaire can include a plurality of questions which require yes or no answers. The questionnaire can be designed as a decision tree, i.e., the response to some of the questions can decide whether the respondent needs to answer other questions. For example, one question can ask the administrator if the process engages in outside communication. If the answer is yes, the respondent will have to state whether the process sends out any emails. Otherwise, the respondent will not have to answer this question.

In one example embodiment, a server can facilitate the data collection effort. For example, the server can prompt each administrator to respond to a questionnaire. There can be various techniques for determining whether to prompt the administrator.

In one example embodiment, a server can include a detection module ("module") for monitoring a feed received from a smart device (or client device) and detecting feasibility of prompting the user to respond to a questionnaire. Because responding to a questionnaire can be processor intensive for a smart device (which has limited processing power and display capabilities, e.g., can display one application at the time), an aspect of the present disclosure ensures that a server prompts a smart device only when there is limited activity demanded of the smart device. This feature of the present disclosure enhances the smart device in that it allows the smart device to prompt the user only when it is technically feasible. As such, this feature enhances the functionality of the smart device and allows the smart device to uses its limited display when it does not interfere with other functions and tasks. Upon detection of a condition in which there is very little demand on the smart device (both in terms of processing demand and display demand), a trigger module of the server can transmit a signal to the smart device to prompt the user to respond to a questionnaire.

FIG. 1 shows an example system 100 including a detection module 111 and a trigger module 121. In this example embodiment, the detection module 111 is on a server 110 and the trigger module 121 is on a server 120. Alternatively, the detection module 110 and the trigger module 120 can be located on the same server or computer network. The detection module 110 can monitor various electronic activities by one or more smart devices. These activities may be received live in the form of feeds from the smart devices (or client devices) or stored on databases 151-153. These databases 151-153 can be associated with the server 110, or they can be independent of server 110.

In one example embodiment, the detection module can monitor incoming and outgoing emails for an email account (or a plurality of email accounts) and based on an attribute of some or all of the emails sent from or received at the email account (or the plurality of email accounts), determine whether it is feasible to contact the smart device. For example, if the smart device is receiving more than 10 emails per hour, the detection module may decide that it is not feasible for the server to contact the smart device. As another example, the detection module may monitor the senders for the emails. If the user receives more than a threshold number of emails in a given time and at least a predetermined percentage of the emails are from contacts of the user (e.g., smart phone contacts or email contacts), the detection module may decide that the smart device is busy, i.e., not feasible for receiving a prompt.

In one example embodiment, the detection module can consider an attribute of an email or email account when classifying the email account as hacked or compromised. The attribute can be, e.g., the number and frequency of emails sent from or received at the email account (or other email accounts from the email account) over a specified period of time; the data or metadata included in each email, e.g., sender address, recipient address, attachment, subject line, the length of the email body and whether or not the email body includes a particular concept or topic as determined by a natural language processing module, or a link; past emails sent from or received at the email account (or other email accounts from the email account) and the metadata associated therewith; whether the email fits the profile of a spam email; the location or device from which the email account is accessed; the time when the email account is accessed or the emails were transmitted or received; or the number of failed attempts to access the email account over a specified period of time.

In one example embodiment, the detection module can consider an attribute of another electronic message or electronic account when determining whether the smart device is busy. For example, the detection module can have access to a social media platform (or electronic messages associated therewith), and based on an activity associated with the user account on the social media, the detection module can determine that the user's email account is compromised. As an example, if the social media account posts a dummy photo stored on the email account or transmits the dummy photo in a message, the detection module can determine that both the email account and the social media are compromised.

In one example, the smart device can receive data from other devices. For example, the smart device can be coupled to a fitness tracker which provides the smart device with fitness data such as heartrate, speed at which the user is walking or moving, etc. The smart device can provide this data to the server and the server can make the determination of whether to prompt the user based on this data (e.g., prompt the user only if the user is not exercising or walking as indicated by heartrate or movement data). In one example, the other device can be Bluetooth enabled devices. In one example, the smart device provide data to the server which indicates whether the smart device is playing a music, displaying a video, or conducting other operation on the Bluetooth enabled device. The server can notify the user only if the smart device is not conducting an operation on another device.

In one example embodiment, the detection module can monitor a social media account on a social media platform, and based on the account's activity, the detection module can determine that the whether it is a good time to notify the user. In one example, the detection module can have access to the account's past activity on the platform and ascertain various patterns for the user of the account. Based on these patterns, the detection module can create a profile for the account, and if the user's behavior deviates from the established profile, the detection module can determine whether the user can be contacted. For example, the detection module can classify the user's "friends" into various classes, e.g., high, medium and low, each class representing a level of interaction between the user and the "friends" in the class. If the user is interacting with several "friends" from the "low" class, the detection module can determine that the user can be contacted. As another example, the detection module can determine subjects of interest for the user of the account, e.g., subjects that user "likes" or about which the user posts on the platform. These subjects can include, e.g., politics and economics. If the user is posting about a discount for a product and sending messages to the user's "friends" in the "low" class, the detection module can determine that it is a good time to contact the user. As yet another example, the detection module can determine a frequency of contact for a social media account. If the account starts transmitting posts and messages at a rate significantly higher than the frequency of contact, the detection module can determine that it is not a good time to contact the user. In one example, the detection module can monitor a plurality of social media accounts. If these accounts start receiving messages, posts or tags from a suspected account that do not fit the profile of the suspected account, the detection module can determine that it is not a good time to contact the user.

In one example embodiment, the detection module can monitor text messages or cellphone notifications and determine whether it is a good time to notify the user. For example, if the user is receiving text messages or notifications at a rate higher than average or more than a threshold number, the server can determine not to notify the user. Upon determining whether to notify the user, the detection module can transmit a signal to the trigger module to trigger an action or prompt the smart device to display the notification to the user.

In one example embodiment, the detection module can be located on a first platform, e.g., server or cluster of computers, and the one or more electronic accounts can also be located on the same platform. In another example embodiment, the detection module can be located on a first platform, but at least one of the electronic accounts can be located on a second platform. In one example, the detection module can have access to a database on the second platform such that the detection module can retrieve electronic communication data or financial transaction data from the second platform. In another example, the second platform can provide the first platform with electronic communication data or financial transaction data.

Figure 2:
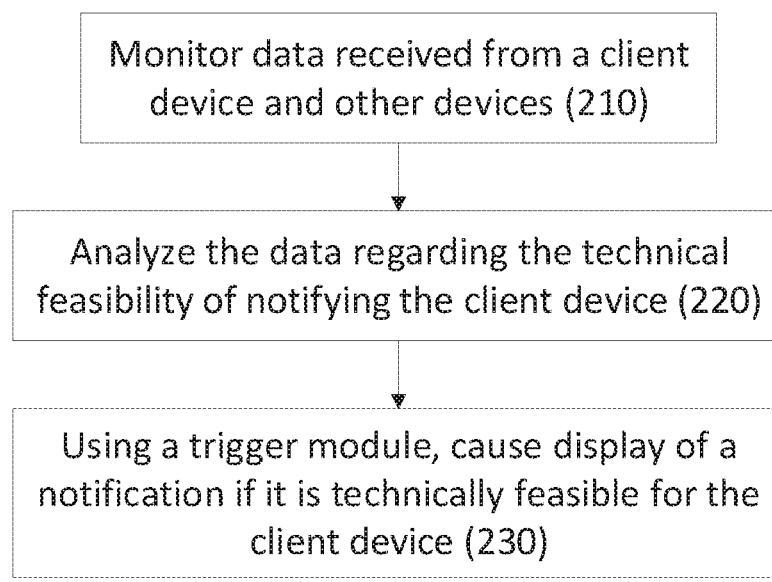
FIG. 2 shows a process for a detection module according to an example embodiment.

FIG. 2 shows a process for a detection module according to an example embodiment. In this example, in step 210, the detection module can monitor various types and forms of data from various devices as explained in FIG. 3. In step 220, the detection module can determine whether it is technically feasible to contact the client device based on the data received and/or monitored in step 210. In step 230, assuming that it is technically feasible to contact the client device, the detection module can use a trigger module to contact the client device. For example, the trigger module can transmit a notification to the client device to display a questionnaire.

Figure 3:
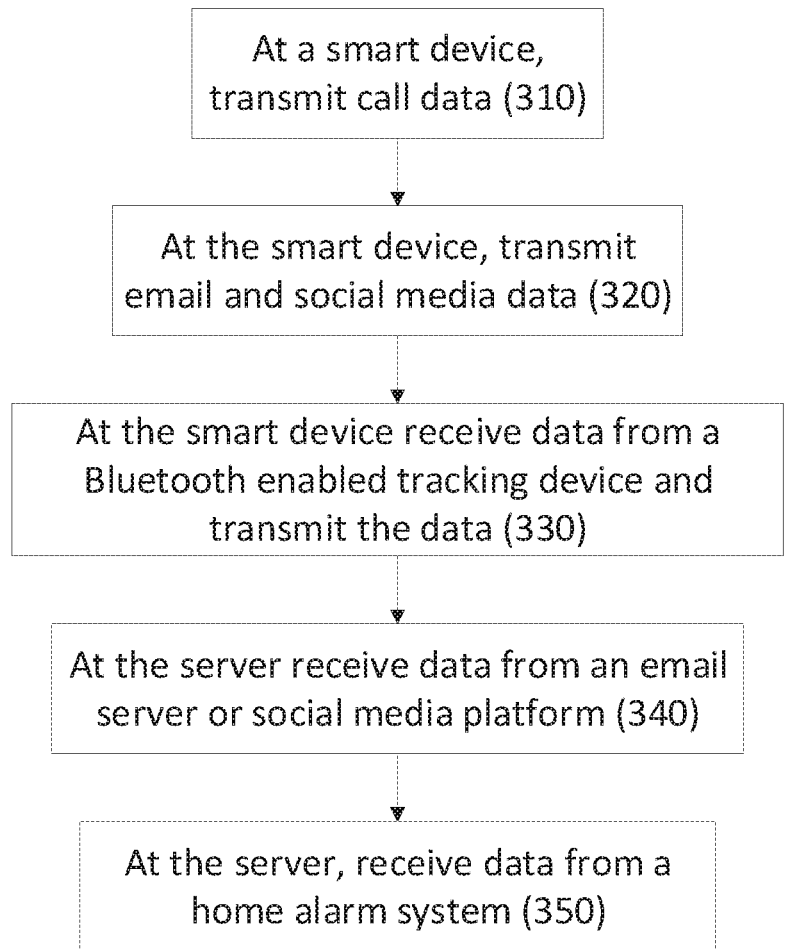
FIG. 3 shows a process for receiving data at a server according to an example embodiment.

FIG. 3 shows a process for receiving data at a server according to an example embodiment. In this example, in step 310, a smart device can transmit call data, e.g., whether the smart device is handling a call. In step 320, the smart device can transmit email and social media data, e.g., how many emails or social media notifications the device received over a period of a few hours. In step 330, the smart device can receive data, e.g., heartrate, from a Bluetooth enabled device, e.g., tracking device, and transmit the data to the server. In step 340, the server can receive email and social media data from an email server or a social media platform. In step, 350, the server can receive data from a home alarm system, which can indicate whether a user is located in the user's home, or whether the user is located in a particular part of the user's home, e.g., home office. The detection module can determine to notify the user only if the user is located in the home office.

Figure 4:
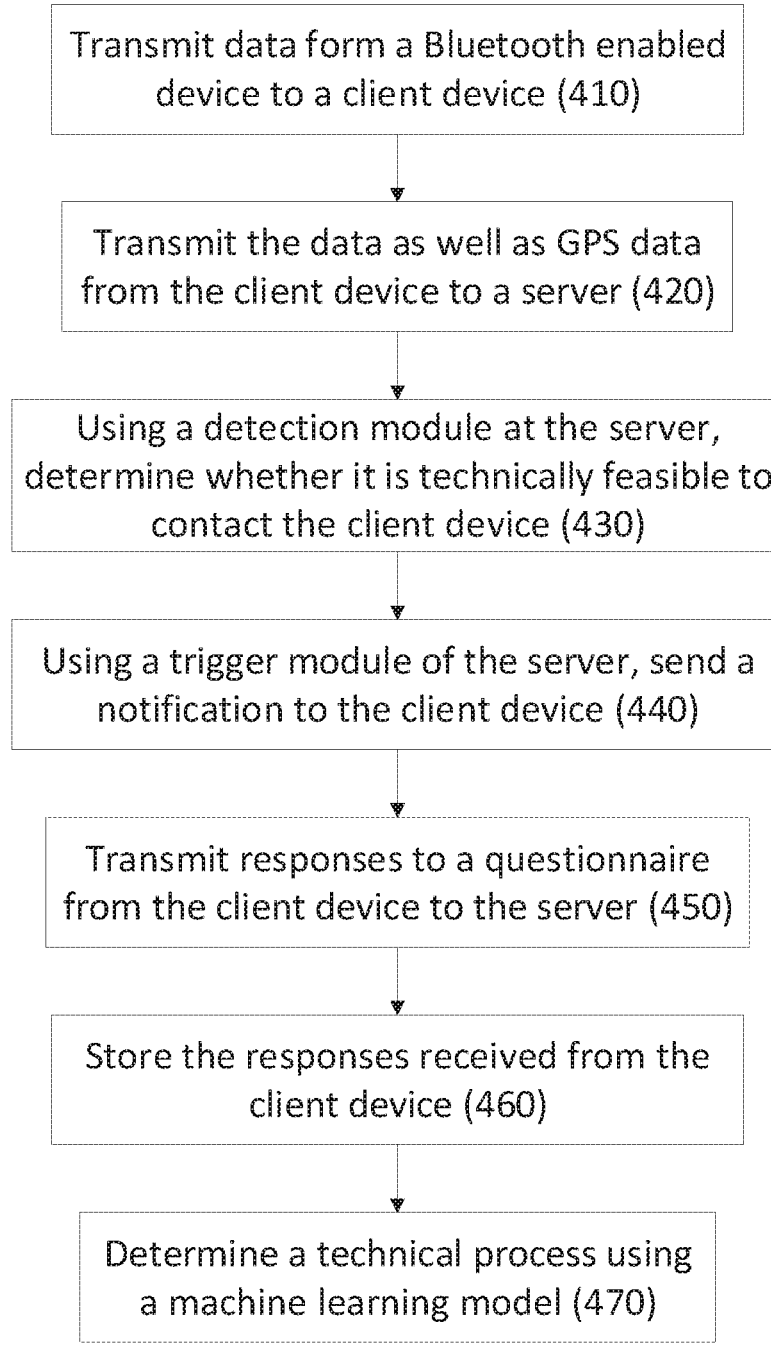
FIG. 4 shows a process for collecting data using a fitness tracker and transmitting the data to a server according to an example embodiment.

FIG. 4 shows a process for collecting data using a fitness tracker and transmitting the data to a server according to an example embodiment. In this example embodiment, in step 410, a fitness tracker can transmit heartrate data to a client device. In step 420, the client device can transmit heartrate data as well as GPS data to a server. In step 430, a detection module of the server can determine whether it is technically feasible to contact the client device. In step 440, a trigger module of the server can send a notification to the client device. In step 450, the client device can transmit to the server the user's responses to the questionnaire. In step 460, the server can store the responses in a database of the server. In step 470, the server can use a machine learning model to determine a technical process using the stored responses.

The system, method and apparatus according to this disclosure optimize data collection by prompting the user (administrator or participant) at a time when it is technically feasible for the smart device to display the survey questions. They also continue asking the questions so long as the questioning does not interrupt the employee's work. In order to effectively collect data from a user, in one embodiment, a user can be prompted with survey questions only when the user is not busy with tasks relating to the user's job. In some embodiments, the questions will continue only for a short period of time as determined by the user's historical activities on the smart device. Furthermore, data collection from a user can be further optimized if the data collection occurs only when the user's smart device is not inundated with other processing intensive tasks. In some embodiments, the smart device decides when to prompt the user to participate in the survey. In other embodiment, a server in communication with the smart device can decide when the user should be prompted (e.g., the smart device provides certain information to the server and the server decides when to prompt the user). The server can send a signal to the smart device to cause the smart device to prompt the user.

In one example embodiment, the user's smart device can monitor the user's activities on the user's smart device and work calendar. There can be a predefined list of activities that are deemed unrelated to the user's job. For example, playing a game or surfing the web on the user's smart device can be considered unrelated to the user's job. The user's work calendar can further inform this process. For example, if on the user's work calendar there is a work related entry (or there is an entry), the smart device can consider the time associated with the user's entry as work time.

The smart device can track a user's unrelated activities and store a log of the activities on the smart device. The smart device (or the server) can run various statistical analyses on this data and determine a pattern for the user's activities unrelated to the user's job. For example, the smart device can determine when it is more likely for the user to engage in activities unrelated to the user's job and determine an average time for these activities. In one example, the server can perform the functions described for the smart device.

In one embodiment, the smart device can prompt the user to answer a survey question when the user engages in an activity unrelated to the user's job, e.g., the user plays a game. In another embodiment, the user can be prompted to answer a survey question when the user is most likely to engage in an activity unrelated to the user's job. Yet in another embodiment, the user can be prompted with survey questions for a period of time not exceeding an average length of time for the user's unrelated activities. Yet in another embodiment, a user cannot be prompted with a survey question if the user has a work related entry on the user's work calendar.

In an example embodiment, a user's historical work habits can be used in determining whether to prompt the user with a question. For example, the smart device can monitor a user's daily activities and determine that the user engages in unrelated activities after lunch. In this example embodiment, the smart device can prompt the user to answer survey questions after lunch.

In yet another example embodiment, the questions of the survey can be divided in several groups, and each group of the questions can be presented to the user at a different time. These groups can be based on item type or content. In some embodiments, a priority score can be associated with each survey question and the user can be presented with higher priority questions before the user is prompted with lower priority questions. For example, questions relating to the certain processes of the company can be given higher priority over other questions. In one example, server can assign questions that take less time with a higher priority score and questions that take longer time with a higher priority score. The server can assign the priority score based on a time it took another user or groups of users to answer the question. The server can ascertain this information by aggregating data received from the smart devices.

In an example embodiment, a user can be presented with the same or updated survey questions periodically, e.g., once every year. These questions can determine whether a process or a sub-process has changed. By surveying the users periodically, the company can keep abreast of the processes implemented in the company. Updated survey questions can also be more specific than the original survey questions.

In some embodiments, the survey questions can be presented to the users only when the processing demand on the user's smart device is low. In local systems, when a user's smart device is busy with other tasks (and/or displays other applications) which require processing power (or GPU power), it can be technically infeasible for the smart device to be prompted with survey questions. This can slow down the user's smart device and interfere with the user's or smart device's activities. With the advent of cloud computing, some companies have migrated their systems to the cloud. However, in some instances, these companies are provided with a limited amount of processing power at any given time. Presenting the users with survey questions when the company's cloud system is close to its processing (or GPU) limit can disrupt the work flow at the company. Therefore, it can be beneficial to avoid prompting the user with survey questions when the user's device has limited processing power.

In an example embodiment, the smart phone of the user can prompt the user with a question prior to displaying the survey questions. For example, the smart device can display a message indicating that the survey questions take 15 minutes to complete, and ask the user if the user wants to participate in the survey. If the user agrees to participate, the smart phone can display the survey questions.

There can be several techniques for optimizing the timing of the survey questions to avoid interference with a smart device's activities, thereby optimizing the performance of the smart device. In one example embodiment, a smart device (or the server) can create a log of the smart device's processing activities. Based on the log, the smart device can determine historical demand on the smart device's processor. For example, the smart device can determine when low processing demand is expected. In this example embodiment, the user is prompted with a survey question only if low demand is expected of the smart device's processor. In an example embodiment, a user is prompted with survey questions only if the current processing demand of the user's device is below a threshold value. In another example embodiment, an average processing demand of the user's device is determined and if the current processing demand is less than the average amount, the user can be prompted with a survey question.

In some embodiments, the user can be prompted with an option to answer the survey questions at a later time. If the user chooses this option, the questioning can be stopped and the user can be asked to answer questions at a later time. In some embodiments, in addition to postponing the questioning, the user can schedule the survey for a specified later time. The smart device can prompt the user at the specified time.

In an example embodiment, the survey can be printed and distributed among the employees of the company. In another example embodiment, the survey can be distributed electronically, e.g., PDF document.

In the above disclosure, in some embodiments, the smart device was described as the device that determines when to prompt the user to participate in a survey. One of ordinary skill in the art recognizes that some of the steps discussed above can be performed by the server, and the server can notify the smart device about the results of these steps. For example, the server can receive data sufficient for the server to determine when to prompt the user. The server can analyze the data and send a signal to the smart device to cause the smart device to prompt a notification to the user.

In one exemplary technique, data from a smart device of the administrator (or user) can be used to prompt the user. The smart device can be a cellphone, tablet, laptop, desktop, wearable device, etc. For example, a server of the company can receive GPS related data from a smart device of the user. Using the GPS data, the server can determine whether the user is present in the company. If the user is present, the server can transmit a message to the workstation of the user. The message can present a pop-up window in the workstation of the user. The pop-up window can display the questions of the questionnaire to the user and the user can respond to the questions.

In one exemplary technique, the server can prompt the user only when the user is not busy. For example, the server can transmit a message to the user only if the user is not on the phone. In this regard, the server can receive data from a modem at the company. The data can indicate which ones of the phone lines of the company are in use. Based on this data, the server can determine whether to prompt the user. Similarly, the server can transmit the message to the user only if the user is not receiving too many emails. In this example, the frequency of receiving emails can be an indication of whether the user is busy. Hence, if the user is receiving emails at a rate greater than a threshold number, the server will not send the message to the user. In an example embodiment, the server can monitor the email traffic for the whole company. The rate at which the company receives and sends emails can be a general indicator for how busy the employees of the company are. In this example, the server can prompt the user only if the email traffic rate for the company falls below a threshold rate.

Various techniques for determining when to contact a user is described. One of ordinary skill in the art recognizes that these techniques can be combined to create other techniques for determining when to contact a user.

As another example, a machine learning technique can be implemented to determine the steps in each process. In this example embodiment, a database can include all the steps identified by the administrators of each process. The database can also include business records for each process. The business records can include, for example, emails, letters, catalogues, accounting records, bank transactions, bank statements, loan statements, credit bureau information, etc. Using the responses to the questionnaires and the business records, a machine learning model can be trained to predict additional steps for each process based on new business records. For example, once the model is trained using process data, such as information about how a customer was contacted and financial statements relating to a process, if the model is then provided with new process data, e.g., credit bureau information relating to that same process, the model can identify additional process steps In one embodiment, an individual employee of the company can be familiar with each process in the company. When a requirement is received, the individual can determine what the requirement is asking the company to do. The employee can also determine which process the requirement applies to. For example, a company can receive a requirement to update a software program implemented in some of the processes of the company. An employee of the company can read this requirement and ascertain what the requirement is asking the company to do. The employee can determine which processes of the company use the specific software program. The employee can communicate this requirement to the administrator for each process that implements the software program. In response, the administrators can install the updates. This process can be very manual and time consuming. A database can be created to store the assignment records for the company. For example, the assignment records can indicate the assignment of past requirements to the processes of the company.

In an example embodiment, all the requirements that the company has received can be stored in a database. The database can also include the assignment record for each requirement, i.e., which process step or activity the requirement was related or assigned to. A machine learning model can be trained to assign requirements to process steps. More specifically, the machine learning model can map the requirements to the questions contained in the administrator questionnaire (or survey). Training the model can be based on labeled data in the form of process steps and requirements already stored in the database, using the supervised learning technique and implementation of 'Decision Tree Algorithms' such as Classification and Regression Tree (CART), Decision Stump, and Conditional Decision Trees.

Using the requirements and assignment records a model can be trained to predict how a new requirement should be processed or assigned. In one embodiment, in addition to the assigned processes, the database can include the steps involved in each process. Using the requirements, the assigned processes and the processes' respective steps, a robust model can be trained to predict assignment of requirements to processes.

It is particularly advantageous to use a machine learning model for classifying the requirements. This technique can reduce manual input in classification of the requirements, and hence, reduce human error. In other words, the model can predict the application of requirements to company processes based on the steps each process includes. Furthermore, one can determine whether the requirement is incorporated or implemented in the company processes by reviewing the steps included in each process. In particular, after the requirement is incorporated in the process(es) of the company, the database including the steps of the processes will reflect this incorporation. Therefore, using the methods described herein, one can also determine whether the requirement is being incorporated in the company.

Figure 5:
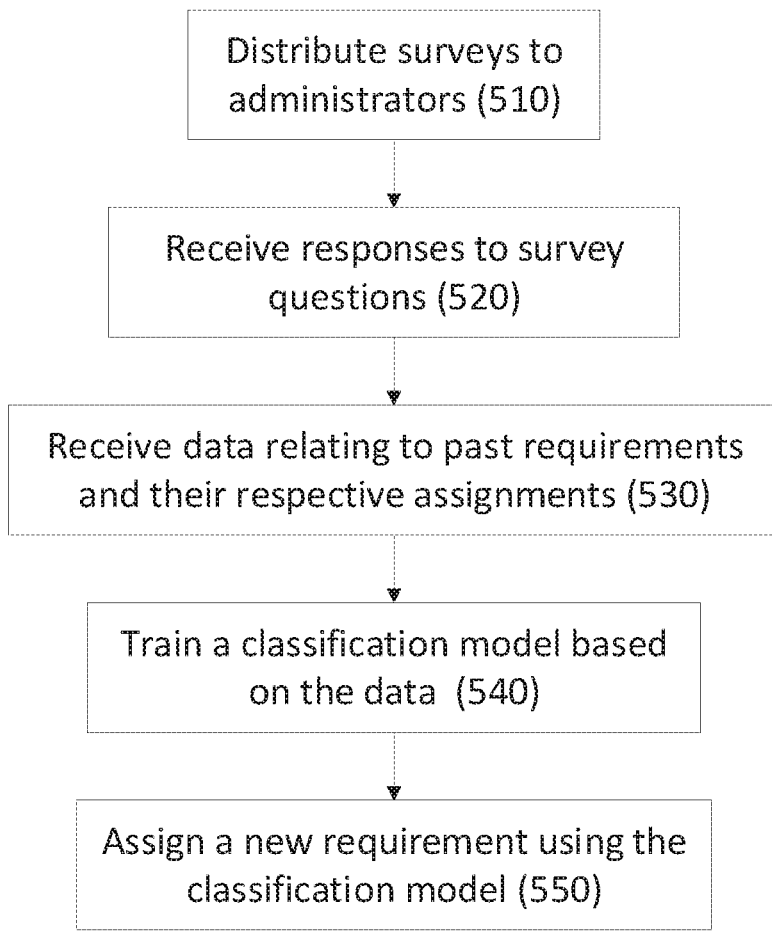
FIG. 5 shows a flow chart for automation of requirement assignment in an example embodiment.

FIG. 5 shows a flow chart for automation of requirement assignment in an example embodiment. In this example embodiment, a company includes three processes: process A, process B and process C. Each process in turn includes several steps. For example, process A includes steps 1, 2 and 3; process B includes steps 2, 3, and 4; and process C includes steps 4, 5, and 6. In this example embodiment, the company has prepared a survey which can gather information about the steps included each process in the company. This survey can be an electronic survey distributed by a server of the company. In step 510, the server can distribute the survey to the administrator for each process, i.e., processes A-C. For example, the survey can ask each administrator to identify all the steps involved in the process overseen by the administrator. As another example, an administrator can be asked if a specific step is involved in the administrator's process, e.g., respond if you oversee step 1; respond if you oversee step 2; etc. As yet another example, the administrator can be asked an indirect question relating to a step overseen by the administrator, e.g., respond if your process includes email communication.

In step 520, the server can receive survey responses from each administrator. The server can store these responses in a database of the server. For example, the survey responses for the administrator of process A can be 1, 2, and 3; the survey responses for the administrator of process B can be 2, 3, and 4; and the survey responses for the administrator of process B can be 3, 4, and 5.

In step 530, the server can receive data including past requirements and assignments for these requirements. For example, one data point in the received data can be a prior requirement which necessitated updating of a software module included in step 2. This requirement was assigned to step 2 of processes A and B. Another data point in the received data can be a prior requirement which necessitated updating of a software module included in step 3. This requirement was assigned to step 3 of processes A, B and C. The server can store each requirement as well as the assignment of the respective requirement in the database.

In step 540, a machine learning model can be trained to predict assignment of requirements based on survey responses. This model can be trained using various data. For example, past requirements and past respective assignments of the requirements can be used to train the model. Additionally, the survey responses can be used to the train the model.

In step 550, a new requirement can be received by the company. The model can be used to assign the requirement to a process or a step of the process.

In one example embodiment, a new process can be created at the company. A model can be used to predict which of the past requirements can be applied to the new process. Additionally, a model can be used to determine whether a new requirement applies to the new process. In this example embodiment, the administrator of the new process will have to fill out a questionnaire. After filling out the questionnaire, the responses can be provided to the machine learning model, which can predict assignment of requirements to processes (and steps thereof). This model can use the responses to the questionnaire to predict which of the past and new requirements apply to the new process.

Figure 6:
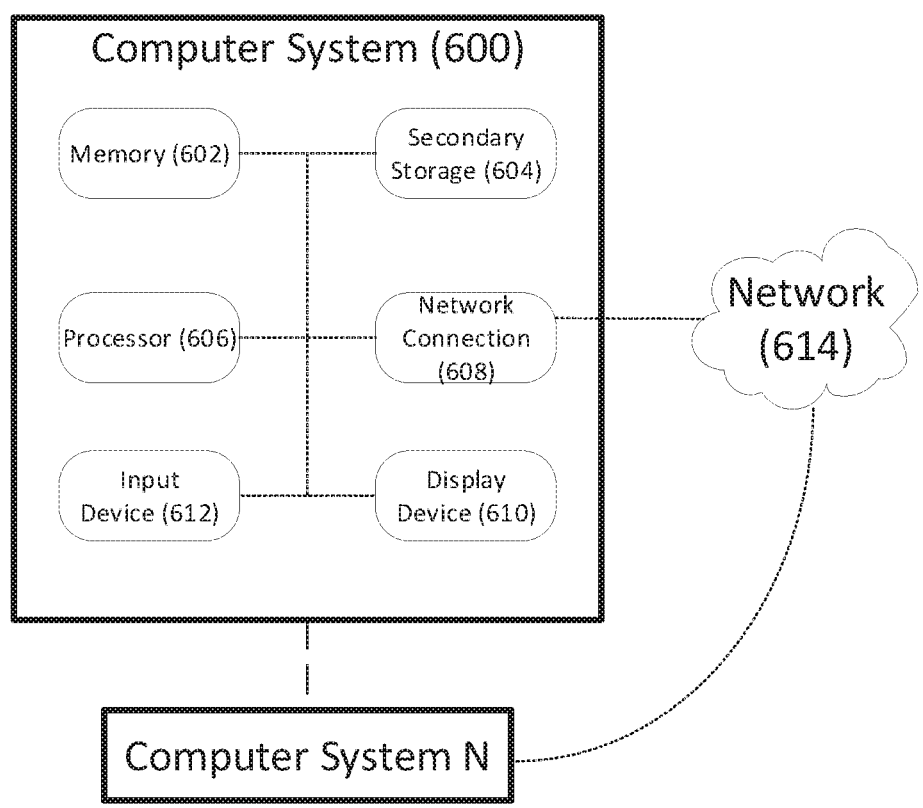
FIG. 6 illustrates exemplary hardware components for a processing unit.

FIG. 6 illustrates exemplary hardware components of a server. A computer system 600, or other computer systems similarly configured, may include and execute one or more subsystem components to perform functions described herein, including the steps of various flow charts described above. Likewise, a mobile device, a cell phone, a smartphone, a laptop, a desktop, a notebook, a tablet, a wearable device, a server, etc., which includes some of the same components of the computer system 600, may run an application (or software) and perform the steps and functionalities described above. Computer system 600 may connect to a network 614, e.g., Internet, or other network, to receive inquiries, obtain data, and transmit information and incentives as described above.

The computer system 600 typically includes a memory 602, a secondary storage device 604, and a processor 606. The computer system 600 may also include a plurality of processors 606 and be configured as a plurality of, e.g., bladed servers, or other known server configurations. The computer system 600 may also include a network connection device 608, a display device 610, and an input device 612.

The memory 602 may include RAM or similar types of memory, and it may store one or more applications for execution by processor 606. Secondary storage device 604 may include a hard disk drive, floppy disk drive, CD-ROM drive, or other types of non-volatile data storage. Processor 606 executes the application(s), such as those described herein, which are stored in memory 602 or secondary storage 604, or received from the Internet or other network 614. The processing by processor 606 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 600 may store one or more database structures in the secondary storage 604, for example, for storing and maintaining the information necessary to perform the above-described functions. Alternatively, such information may be in storage devices separate from these components.

Also, as noted, processor 606 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 600.

The input device 612 may include any device for entering information into the computer system 600, such as a touchscreen, keyboard, mouse, cursor-control device, microphone, digital camera, video recorder or camcorder. The input and output device 612 may be used to enter information into GUIs during performance of the methods described above. The display device 610 may include any type of device for presenting visual information such as, for example, a computer monitor or flat-screen display (or mobile device screen). The display device 610 may display the GUIs and/or output from sub-system components (or software).

Examples of the computer system 600 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 600 is shown in detail, system 600 may use multiple computer systems or servers as necessary or desired to support the users and may also use back-up or redundant servers to prevent network downtime in the event of a failure of a particular server. In addition, although computer system 600 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 600, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A server, comprising:
one or more processors in data communication with one or more memories, the one or more memories containing a classification model and a database, the database containing one or more assignment records for past assignments for requirement for computer updates,
wherein the one or more processors are configured to:
receive, from an email server, an email frequency signal indicating a frequency of receiving emails at a smart device,
receive, from a phone server, a phone status signal indicating whether a phone line of the smart device is active,
determine, based on the email frequency signal, the phone status signal, technical feasibility and limited activity associated with the smart device, whether to transmit a third signal to the smart device, the third signal configured to cause the smart device to interact with a user through one or more interactive prompts comprising an informational questionnaire and to optimize data collection of a set of data from the user through the one or more interactive prompts by the smart device, receive at the server the set of data collected by the smart device, store the set of data in the database, train the classification model using the set of data, and the one or more assignment records to predict assignment of requirements to processes, receive at the server a new requirement for updating the smart device, wherein the new requirement is a technical requirement, assign, using the trained classification model, the new requirement to at least one computer process of the smart device, and transmit a patch to the smart device to update the at least one computer process.

2. The server of claim 1, wherein the one or more processors are further configured to determine to transmit the third signal to the smart device if the phone status signal indicates the phone line of the smart device is inactive.

3. The server of claim 1, wherein the one or more processors are further configured to determine to transmit the third signal to the smart device if the email frequency signal indicates the email frequency is below a threshold.

4. The server of claim 1, wherein the one or more processors are further configured to:

receive, from the smart device of the user, a location signal indicating a location of the smart device, and the determination of whether to transmit the third signal to the smart device comprises determining, based on the email frequency signal, the phone status signal, and the location signal whether to transmit the third signal to the smart device.

5. The server of claim 4, wherein the one or more processors are further configured to determine to transmit the third signal to the smart device if the smart device is within a predefined location.

6. The server of claim 1, wherein the one or more processors are further configured to:

receive, from the smart device of the user, a heart rate signal indicating a heart rate of the user, and the determination of whether to transmit the third signal to the smart device comprises determining, based on the email frequency signal, the phone status signal, and the heart rate signal whether to transmit the third signal to the smart device.

7. The server of claim 6, wherein the heart rate signal indicates whether the user is at least one selected from the group of running and walking.

8. The server of claim 1, wherein the third signal is configured to cause a user interface of the smart device to display the one or more interactive prompts to the user to collect the set of data from the user.

9. The server of claim 8, wherein the one or more interactive prompts comprise the informational questionnaire inquiring about a process and at least one sub-process assigned to the user.

10. The server of claim 9, wherein the questionnaire includes a plurality of binary questions.

11. The server of claim 9, wherein the questionnaire is a decision tree.

12. The server of claim 9, wherein the database includes a plurality of requirements and the one or more assignment records describe assignment of each requirement in the database to processes and sub-processes.

13. A method performed by a server comprising one or more processors in data communication with one or more memories, the one or more memories containing a classification model and a database, the database containing one or more assignment records for past assignments for requirement for computer updates, the method comprising:

receiving, from an email server, an email frequency signal indicating a frequency of receiving emails at a smart device, receiving, from a phone server, a phone status signal indicating whether a phone line of the smart device is active, determining, based on the email frequency signal, the phone status signal, technical feasibility and limited activity associated with the smart device, whether to transmit a third signal to the smart device, the third signal configured to cause the smart device to interact with a user through one or more interactive prompts comprising an informational questionnaire and to optimize data collection of a set of data from the user through the one or more interactive prompts by the smart device, receiving at the server the set of data collected by the smart device, storing the set of data in the database, training the classification model using the set of data, and the one or more assignment records to predict assignment of requirements to processes, receiving at the server a new requirement for updating the smart device, wherein the requirement is a technical requirement, assigning, using the trained classification model, the new requirement to at least one computer process of the smart device, and transmitting a patch to the smart device to update the at least one computer process.

14. The method of claim 13, wherein training the classification model includes a supervised learning technique and implementation of a Decision Tree Algorithm.

15. The method of claim 14, wherein the Decision Tree Algorithm is at least one selected from the group of a Classification and Regression Tree (CART), a Decision Stump, and Conditional Decision Trees.

16. The method of claim 13, wherein the new requirement is a legal requirement imposed by state or federal law.

17. The method of claim 16, wherein the new requirement obligates a company associated with the user to change an operational process.

18. A non-transitory computer-readable medium including instructions, that, when executed by a server comprising one or more processors in data communication with one or more memories, the one or more memories containing a classification model and a database, the database containing one or more assignment records for past assignments for requirement for computer updates, cause the server to perform procedures comprising:

receiving, from an email server, an email frequency signal indicating a frequency of receiving emails at a smart device;

receiving, from a phone server, a phone status signal indicating whether a phone line of the smart device is active;

determining, based on the email frequency signal, the phone status signal, technical feasibility and limited activity associated with the smart device, whether to transmit a third signal to the smart device, the third signal configured to cause the smart device to interact with a user through one or more interactive prompts comprising an informational questionnaire and to optimize data collection of a set of data from the user through the one or more interactive prompts by the smart device;

receiving at the server the set of data collected by the smart device;

storing the set of data in the database;

training the classification model using the set of data, and the one or more assignment records to predict assignment of requirements to processes;

receiving at the server a new requirement for updating the smart device, wherein the new requirement is a technical requirement;

assigning, using the trained classification model, the new requirement to at least one computer process of the smart device; and transmitting a patch to the smart device to update the at least one computer process.

19. The non-transitory computer-readable medium of claim 18, wherein the new requirement relates to an operational aspect of a business.

\* \* \* \* \*